(12) United States Patent
Fujinoki

(10) Patent No.: US 11,011,779 B2
(45) Date of Patent: May 18, 2021

(54) SOLID ELECTROLYTE CONTAINING COMPOSITE METAL HALIDE CONTAINING MAGNESIUM, ALKALINE-EARTH METAL, GALLIUM, AND HALOGEN, AND SECONDARY BATTERY INCLUDING THE SAME

(71) Applicant: Panasonic Intellectual Property Management Co., Ltd., Osaka (JP)

(72) Inventor: Norihito Fujinoki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 156 days.

(21) Appl. No.: 16/351,526

(22) Filed: Mar. 13, 2019

(65) Prior Publication Data
US 2019/0296391 A1 Sep. 26, 2019

(30) Foreign Application Priority Data
Mar. 22, 2018 (JP) .............................. JP2018-054011

(51) Int. Cl.
*H01M 4/131* (2010.01)
*H01M 4/66* (2006.01)
*H01M 10/0562* (2010.01)
*H01M 10/054* (2010.01)
*H01M 4/02* (2006.01)

(52) U.S. Cl.
CPC ....... *H01M 10/0562* (2013.01); *H01M 4/131* (2013.01); *H01M 4/663* (2013.01); *H01M 10/054* (2013.01); *H01M 2004/027* (2013.01); *H01M 2004/028* (2013.01); *H01M 2300/008* (2013.01)

(58) Field of Classification Search
CPC ............ H01M 4/36; H01M 4/13; H01M 4/30; H01M 10/0562; H01M 10/054
See application file for complete search history.

(56) References Cited

U.S. PATENT DOCUMENTS

| 3,827,913 | A  | * | 8/1974 | Butherus | ........... | H01M 10/0562 |
|---|---|---|---|---|---|---|
|  |  |  |  |  |  | 429/304 |
| 2012/0115028 | A1 | * | 5/2012 | Ueno | ................ | H01M 10/0525 |
|  |  |  |  |  |  | 429/209 |

OTHER PUBLICATIONS

Yasumasa Tomita et al., "Synthesis, crystal structure, and Mg-ion conductivity of MgM2X8 (M=Al, Ga; X =Cl, Br)", Annual Meeting of Japan Society for Molecular Science 2015 presentation abstract No. 1P024, Aug. 31, 2015.

* cited by examiner

*Primary Examiner* — Kenneth J Douyette
(74) *Attorney, Agent, or Firm* — McDermott Will and Emery LLP

(57) ABSTRACT

A solid electrolyte contains a composite metal halide. The composite metal halide contains magnesium, an alkaline-earth metal having a larger ionic radius than magnesium, gallium, and a halogen. In the composite metal halide, the molar ratio of the alkaline-earth metal to the total of magnesium and the alkaline-earth metal is less than 0.2.

12 Claims, 1 Drawing Sheet

SOLID ELECTROLYTE CONTAINING COMPOSITE METAL HALIDE CONTAINING MAGNESIUM, ALKALINE-EARTH METAL, GALLIUM, AND HALOGEN, AND SECONDARY BATTERY INCLUDING THE SAME

BACKGROUND

1. Technical Field

The present disclosure relates to a solid electrolyte and a secondary battery including the solid electrolyte.

2. Description of the Related Art

In recent years, secondary batteries with multivalent ionic conductivity have been expected to be put to practical use. Among them, magnesium secondary batteries have a higher theoretical capacity density than lithium-ion batteries in the related art.

Yasumasa Tomita et al. ("Synthesis, crystal structure and Mg ionic conductivity of $MgM_2X_8$ (M=Al, Ga; X=Cl, Br)" 1P024, Annual Meeting of Japan Society for Molecular Science, September, 2015) disclose a solid electrolyte represented by $MgGa_2Cl_{8-x}Br_x$ (x=0 to 7).

SUMMARY

In one general aspect, the techniques disclosed here feature a solid electrolyte containing a composite metal halide containing magnesium, an alkaline-earth metal having a larger ionic radius than magnesium, gallium, and a halogen. In the composite metal halide, the molar ratio of the alkaline-earth metal to the total of magnesium and the alkaline-earth metal is less than 0.2.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
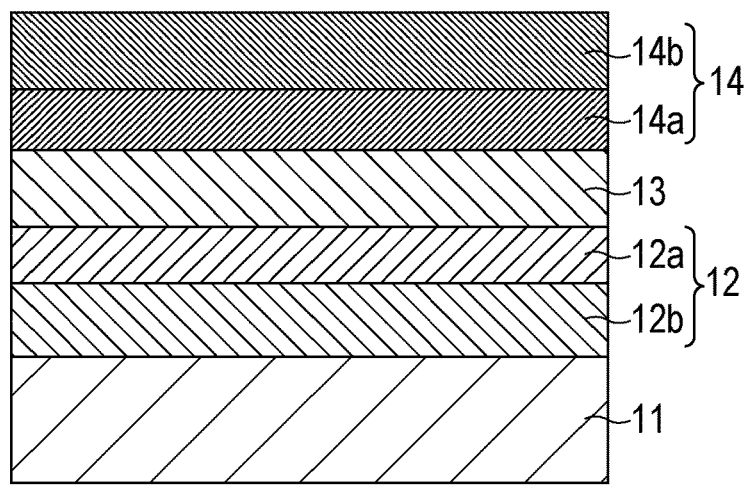
FIG. 1 is a schematic cross-sectional view illustrating an example of the structure of a secondary battery according to an embodiment.

A solid electrolyte according to an embodiment will be described in detail with reference to attached drawings.

The following description indicates general or specific embodiments. Numerical values, compositions, shapes, thicknesses, electrical characteristics, structures of secondary batteries, electrode materials, and other features described in the embodiments are merely examples, and are not intended to limit the scope of the present disclosure. Additionally, structural elements that are not recited in any one of the independent claims indicating the broadest concept are described as arbitrary structural elements.

While a solid electrolyte mainly used for a secondary battery will be described below, the application of the solid electrolyte of the present disclosure is not limited thereto. The solid electrolyte may be used in an electrochemical device such as an ion-concentration sensor.

1. Solid Electrolyte

1-1. Composition of Solid Electrolyte

Divalent magnesium ions have greater electrostatic interactions with anions in a solid electrolyte than monovalent lithium ions and do not easily diffuse in the solid electrolyte. Thus, the solid electrolyte that conducts magnesium ions is required to have improved ionic conductivity.

To deal with this issue, the inventors have found a new solid electrolyte described below.

A solid electrolyte according to an embodiment contains a composite metal halide. The composite metal halide contains magnesium, an alkaline-earth metal having a larger ionic radius than magnesium, gallium, and a halogen. In the composite metal halide, the molar ratio of the alkaline-earth metal to the total of magnesium and the alkaline-earth metal is less than 0.2.

The composite metal halide may be represented by the following general formula: $Mg_{1-a}M_aGa_2X_8$, where M is at least one selected from the group consisting of Ca, Sr, and Ba, X is at least one selected from the group consisting of Cl, Br, and I, and a satisfies $0<a<0.2$.

The elemental composition of the solid electrolyte can be quantitatively determined by, for example, X-ray photoelectron spectroscopy (XPS).

In the general formula described above, a represents a substitution ratio and satisfies $0<a<0.2$. This results in an increased lattice size to the extent that the structural stability of the solid electrolyte is not impaired, and thus results in improved magnesium-ion conductivity in the solid electrolyte.

In the general formula, a may satisfy $0.02 \leq a \leq 0.15$ or may satisfy $0.05 \leq a \leq 0.10$.

In the general formula, X may be Cl.

In the general formula, M may be Ca, Sr, or Ba.

A magnesium ion has an ionic radius, i.e., crystal radius, of 0.86 Å. A calcium ion has an ionic radius, i.e., crystal radius, of 1.14 Å. A strontium ion has an ionic radius of 1.32 Å. A barium ion has an ionic radius of 1.49 Å.

The solid electrolyte is in the form of, for example, a layer. The layer has a thickness of, for example, 0.5 μm or more and 200 μm or less. This results in reduced resistance to magnesium ion conduction while ensuring safety such as short-circuit prevention. For example, in the case where the solid electrolyte has an ionic conductivity of $1 \times 10^{-6}$ S/cm and where the layer of the solid electrolyte has a thickness of 1 μm, the solid electrolyte can have a resistance of 100 $\Omega \cdot cm^2$ or less per unit area.

1-2. Improvement in Magnesium-Ion Conduction

Typically, magnesium compounds tend to exhibit no magnesium-ion conduction or tend to exhibit very low ionic conductivity. This is because divalent magnesium ions strongly interact electrostatically with surrounding anions, compared with monovalent alkali metal ions (for example, lithium ions). In contrast, the solid electrolyte according to the embodiment has good magnesium-ion conductivity. This is presumed to be due to two reasons described below.

First, the composite metal halide according to the embodiment contains gallium and thus can promote the dissociation of magnesium ions. MgGa$_2$X$_8$ is formed of an octahedron in which halogen ions are hexacoordinated with a magnesium ion and a tetrahedron in which halogen ions are tetracoordinated with a gallium ion in an at least short-range-order region. Because gallium has larger electronegativity than magnesium, gallium ions can attract the charge of the surrounding halogen ions. This can promote the dissociation of magnesium ions.

Second, Mg$_{1-a}$M$_a$Ga$_2$X$_8$ has a structure in which Mg of MgGa$_2$X$_8$ is partially substituted with Ca, Sr, and/or Ba. Because each of Ca, Sr, and Ba has a larger ionic radius than Mg, the substitution extends the size of the lattice of the coordination polyhedron and/or the distance between coordination polyhedra. This expands a space through which magnesium ions migrate and reduces the Coulomb repulsion acting between magnesium ions, thereby allowing magnesium ions to migrate more easily.

Accordingly, the solid electrolyte according to the embodiment has good magnesium-ion conductivity by virtue of the action of gallium and the action of Ca, Sr, and/or Ba.

1-3. Method for Producing Solid Electrolyte

The solid electrolyte according to the embodiment can be produced by, for example, mixing metal halides and firing the resulting mixture.

For example, a magnesium halide, a gallium halide, and a halide of an alkaline-earth metal are used as raw materials. Examples of the magnesium halide include MgCl$_2$, MgBr$_2$, and MgI$_2$. Examples of the gallium halide include GaCl$_3$, GaBr$_3$, and GaI$_3$. Examples of the halide of the alkaline-earth metal include CaCl$_2$, CaBr$_2$, CaI$_2$, SrCl$_2$, SrBr$_2$, SrI$_2$, BaCl$_2$, BaBr$_2$, and BaI$_2$. The amount of each of the raw materials is appropriately adjusted in accordance with the composition of a target solid electrolyte.

The raw materials are mixed by a known method. Examples of a method of mixing include a method of mixing in a mortar, a method of mixing by a mechanical milling process, a method of mixing with a bead mill, and a method of mixing with a jet mill. The method of mixing may be a dry mixing method or a wet mixing method.

The mixture of the raw materials is sintered by heating, for example, in an inert atmosphere at 200° C. to 500° C. for 12 to 24 hours.

The solid electrolyte according to the embodiment is produced by the production method described above.

The method for producing the solid electrolyte according to the embodiment is not limited to the method exemplified above. For example, the raw materials may be elemental materials. For example, the raw materials may be metal oxides or organic materials. The solid electrolyte may be formed by a known film formation method. Examples of the film formation method include sol-gel methods, metal-organic compound decomposition (MOD) methods, atomic layer deposition (ALD) methods, chemical vapor deposition (CVD) methods, and liquid-phase film formation methods.

2. Secondary Battery 2-1. Overall Structure

FIG. 1 is a schematic cross-sectional view illustrating a secondary battery 10 according to the embodiment.

The secondary battery 10 includes a substrate 11, a positive electrode 12, a solid electrolyte layer 13, and a negative electrode 14. The solid electrolyte layer 13 is disposed between the positive electrode 12 and the negative electrode 14. Magnesium ions can migrate between the positive electrode 12 and the negative electrode 14 through the solid electrolyte layer 13.

The secondary battery 10 may have a cylindrical, prismatic, button-like, coin-like, or flat-shaped structure.

For example, the secondary battery 10 is housed in a battery case. The secondary battery 10 and/or the battery case may have, for example, a rectangular shape, a circular shape, an elliptic shape, or a hexagonal shape in plan view.

2-2. Solid Electrolyte

The solid electrolyte layer 13 is composed of, for example, a solid electrolyte identical to that described in Section "1. Solid Electrolyte".

The solid electrolyte layer 13 may be composed of another solid electrolyte. Examples of another solid electrolyte include magnesium phosphorus oxynitride, Mg$_x$SiO$_y$N$_z$ (where 1<x<2, 3<y<5, and 0≤z<1), Mg$_x$M$_y$SiO$_z$ (where M is at least one selected from the group consisting of Ti, Zr, Hf, Ca, Sr, and Ba, 0<x<2, 0<y<2, and 3<z<6), Mg$_{2-1.5x}$Al$_x$SiO$_4$ (where 0.1≤x≤1), Mg$_{2-1.5x-0.5y}$Al$_{x-y}$Zn$_y$SiO$_4$ (where 0.5≤x≤1, 0.5≤y≤0.9, x−y≥0, and x+y≤1), MgZr$_4$(PO$_4$)$_6$, MgMPO$_4$ (where M is at least one selected from Zr, Nb, and Hf), Mg$_{1-x}$A$_x$M(M'O$_4$)$_3$ (where A is at least one selected from Ca, Sr, Ba, and Ra, M is at least one selected from Zr and Hf, M' is at least one selected from W and Mo, and 0≤x<1), and Mg(BH$_4$)(NH$_2$).

A polyelectrolyte, a gel electrolyte, or an electrolytic solution may be used in place of the solid electrolyte layer 13.

2-3. Substrate

The substrate 11 may be an insulating substrate or a conductive substrate. Examples of the substrate 11 include glass substrates, plastic substrates, polymer films, silicon substrates, metal plates, metal foil sheets, and laminates thereof. The substrate may be commercially available or produced by a known method.

In the secondary battery 10, the substrate 11 may be omitted.

2-4. Positive Electrode

The positive electrode 12 includes, for example, a positive electrode mixture layer 12a containing a positive electrode active material and a positive electrode current collector 12b.

The positive electrode mixture layer 12a contains the positive electrode active material that can occlude and release magnesium ions.

Examples of the positive electrode active material include metal oxides, polyanionic salts, sulfides, chalcogenide compounds, and hydrides. Examples of the metal oxides include transition metal oxides such as V$_2$O$_5$, MnO$_2$, and MoO$_3$ and magnesium composite oxides such as MgCoO$_2$ and MgNiO$_2$. Examples of the polyanionic salts include MgCoSiO$_4$, MgMnSiO$_4$, MgFeSiO$_4$, MgNiSiO$_4$, MgCo$_2$O$_4$, and MgMn$_2$O$_4$. An example of the sulfides is Mo$_6$S$_8$. An example of the chalcogenide compounds is Mo$_9$Se$_{11}$.

The positive electrode active material is, for example, a crystalline material. The positive electrode mixture layer 12a may contain two or more positive electrode active materials.

The positive electrode mixture layer 12a may further contain a conductive material and/or a binder, as needed. As described below, the positive electrode mixture layer 12a may further contain solid electrolyte particles.

The conductive material is not particularly limited, and any electron conductive material may be used. Examples of the conductive material include carbon materials, metals, and conductive polymers. Examples of the carbon materials include graphites such as natural graphites, e.g., massive graphite and flake graphite, and artificial graphites, acetylene black, carbon black, Ketjenblack, carbon whiskers, needle coke, and carbon fibers. Examples of the metals include copper, nickel, aluminum, silver, and gold. These materials may be used separately or in combination as a mixture of two or more. The conductive material may be, for example, carbon black or acetylene black in view of electron conductivity and coatability.

The binder is not particularly limited, and any binder that functions to retain the particles of the active material and the particles of the conductive material may be used. Examples of the binder include fluorine-containing resins such as polytetrafluoroethylene (PTFE), poly(vinylidene fluoride) (PVdF), and fluorine-containing rubber, thermoplastic resins such as polypropylene and polyethylene, ethylene-propylene terpolymer (EPDM) rubber, sulfonated EPDM rubber, and natural butyl rubber (NBR). These materials may be used separately or in combination as a mixture of two or more. The binder may be, for example, an aqueous dispersion of a cellulosic material or styrene-butadiene rubber (SBR).

Examples of a solvent in which the positive electrode active material, the conductive material, and the binder are dispersed include N-methylpyrrolidone, dimethylformamide, dimethylacetamide, methyl ethyl ketone, cyclohexanone, methyl acetate, methyl acrylate, diethylenetriamine, N,N-dimethylaminopropylamine, ethylene oxide, and tetrahydrofuran. For example, a thickner may be added to the dispersion medium. Examples of the thickner include carboxymethyl cellulose and methylcellulose.

For example, the positive electrode mixture layer 12a is formed as follows: The positive electrode active material, the conductive material, and the binder are mixed together. An appropriate solvent is added to the resulting mixture to form a positive electrode mixture in paste form. The resulting positive electrode mixture is applied to a surface of the positive electrode current collector 12b and dried, thereby forming the positive electrode mixture layer 12a on the positive electrode current collector 12b. The positive electrode mixture may be pressed in order to increase the current density.

The thickness of the positive electrode mixture layer 12a is, but not particularly limited to, for example, 1 μm or more and 100 μm or less.

Figure 2:
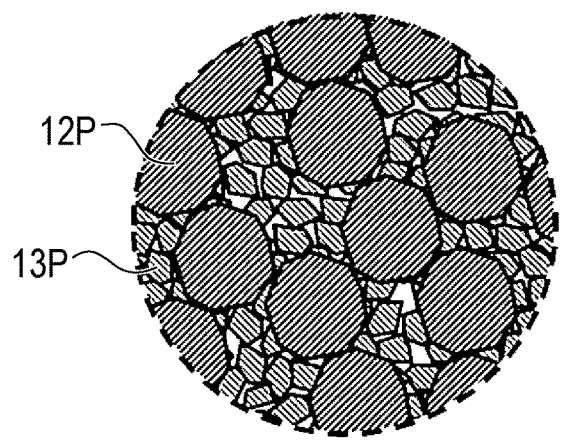
FIG. 2 is an enlarged, schematic cross-sectional view illustrating an example of the structure of a positive electrode mixture layer of a secondary battery according to an embodiment.

FIG. 2 is an enlarged, schematic cross-sectional view illustrating an example of the structure of the positive electrode mixture layer 12a. In FIG. 2, the positive electrode mixture layer 12a contains positive electrode active material particles 12P and solid electrolyte particles 13P. In this example, the solid electrolyte layer 13 contains the same particles as the solid electrolyte particles 13P. These particles can be composed of the material described in Section "1. Solid Electrolyte". In FIG. 2, the conductive material and the binder are omitted.

Figure 3:
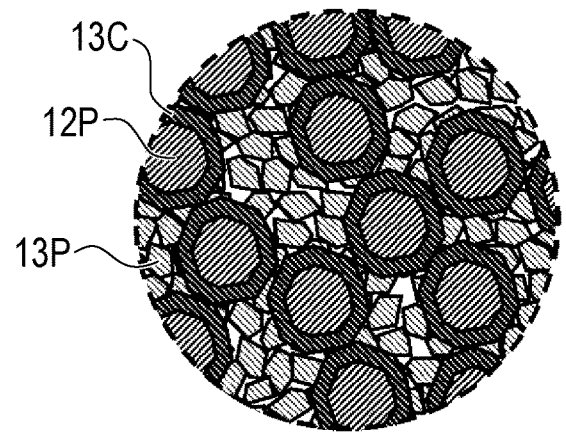
FIG. 3 is an enlarged, schematic cross-sectional view illustrating another example of the structure of a positive electrode mixture layer of a secondary battery according to an embodiment.

FIG. 3 is an enlarged, schematic cross-sectional view illustrating another example of the structure of the positive electrode mixture layer 12a. In FIG. 3, the positive electrode mixture layer 12a contains the positive electrode active material particles 12P and the solid electrolyte particles 13P. Each of the positive electrode active material particles 12P is covered with a solid electrolyte coat 13C. In this example, the solid electrolyte layer 13 contains the same particles as the solid electrolyte particles 13P. These particles can be composed of the material exemplified as "another solid electrolyte" described in Section "2-2. Solid Electrolyte". The solid electrolyte coats 13C can be composed of the material described in Section "1. Solid Electrolyte". For example, the solid electrolyte coats 13C can be formed on the surfaces of the positive electrode active material particles before the positive electrode active material particles are mixed with the conductive material and the binder. In FIG. 3, the conductive material and the binder are omitted.

The positive electrode 12 may include a positive electrode active material layer consisting only of the positive electrode active material, in place of the positive electrode mixture layer 12a. In this case, the layer 12a illustrated in FIG. 1 corresponds to the positive electrode active material layer.

The positive electrode current collector 12b is composed of an electronic conductor that does not undergo a chemical change within the range of the operating voltage of the secondary battery 10 in the presence of the positive electrode mixture layer 12a. The operating voltage of the positive electrode current collector 12b may be in the range of, for example, +1.5 V to +4.5 V with respect to the standard redox potential of metallic magnesium.

The material of the positive electrode current collector 12b is, for example, a metal or an alloy. More specifically, the material of the positive electrode current collector 12b may be a metal or an alloy containing at least one selected from the group consisting of copper, chromium, nickel, titanium, platinum, gold, aluminum, tungsten, iron, and molybdenum. The material of the positive electrode current collector 12b may be, for example, aluminum, an aluminum alloy, platinum, or gold in view of electronic conductivity, resistance to the ionic conductor, and the redox potential.

The positive electrode current collector 12b may be formed of a transparent conductive film. Examples of the transparent conductive film include indium-tin oxide (ITO) films, indium-zinc oxide (IZO) films, fluorine-doped tin oxide (FTO) films, antimony-doped tin oxide (ATO) films, indium oxide ($In_2O_3$) films, tin oxide ($SnO_2$) films, and Al-containing ZnO films.

The positive electrode current collector 12b may be in the form of a plate or foil. The positive electrode current collector 12b may be formed of a laminated film including the metal and/or the transparent conductive film.

In the case where the substrate 11 is composed of a conductive material and also serves as the positive electrode current collector 12b, the positive electrode current collector 12b may be omitted.

2-5. Negative Electrode

The negative electrode 14 includes, for example, a negative electrode mixture layer 14a containing a negative electrode active material and a negative electrode current collector 14b.

The negative electrode mixture layer 14a contains the negative electrode active material that can occlude and release magnesium ions.

In this case, an example of the negative electrode active material is a carbon material. Examples of the carbon material include graphite, non-graphite carbon materials such as hard carbon and coke, and graphite intercalation compounds.

The negative electrode mixture layer 14a may contain two or more negative electrode active materials.

The negative electrode mixture layer 14a may further contain a conductive material and/or a binder, as needed. For example, the conductive material, the binder, the solvent, and the thickener described in Section "2-4. Positive Electrode" may be appropriately used.

The negative electrode mixture layer 14a may further contain solid electrolyte particles. The negative electrode mixture layer 14a may have the same structure as in FIG. 2 or 3 described in Section "2-4. Positive Electrode". In this case, the particles 12P described in FIG. 2 or 3 correspond to negative electrode active material particles.

The thickness of the negative electrode mixture layer 14a is, but not particularly limited to, for example, 1 μm or more and 50 μm or less.

The negative electrode 14 may include a negative electrode metal layer that can dissolve and deposit metallic magnesium in place of the negative electrode mixture layer 14a. In this case, the layer 14a in FIG. 1 corresponds to the negative electrode metal layer.

In this case, the negative electrode metal layer is composed of a metal or an alloy. Examples of the metal include magnesium, tin, bismuth, and antimony. An example of the alloy is an alloy of magnesium and at least one selected from aluminum, silicon, gallium, zinc, tin, manganese, bismuth, and antimony.

A solid electrolyte film may be disposed on the negative electrode metal layer. In this case, for example, the solid electrolyte layer 13 can be composed of the material exemplified as "another solid electrolyte" described in Section "2-2. Solid Electrolyte". The solid electrolyte film can be composed of the material described in Section "1. Solid Electrolyte".

The negative electrode current collector 14b is composed of an electronic conductor that does not undergo a chemical change within the range of the operating voltage of the secondary battery 10 in the presence of the negative electrode mixture layer 14a or the negative electrode metal layer. The operating voltage of the negative electrode current collector may be in the range of, for example, 0 V to +1.5 V with respect to the standard reduction potential of magnesium.

For example, the same material as the positive electrode current collector 12b described in Section "2-4. Positive Electrode" may be appropriately used as the material of the negative electrode current collector 14b. The negative electrode current collector 14b may be in the form of a plate or foil.

In the case where the negative electrode 14 includes the negative electrode metal layer that can dissolve and deposit metallic magnesium, this metal layer may serve as the negative electrode current collector 14b.

2-6. Supplement

The positive electrode current collector 12b, the negative electrode current collector 14b, the positive electrode mixture layer 12a, the negative electrode metal layer 14a can be formed by, for example, a physical deposition method or chemical deposition method. Examples of the physical deposition method include sputtering methods, vacuum deposition methods, ion plating methods, and pulsed laser deposition (PLD) methods. Examples of the chemical deposition method include atomic layer deposition (ALD) methods, chemical vapor deposition (CVD) methods, liquid-phase film formation methods, sol-gel methods, metal-organic compound decomposition (MOD) methods, spray pyrolysis decomposition (SPD) methods, doctor blade methods, spin coating methods, and printing techniques. Examples of the CVD methods include plasma-enhanced CVD methods, thermal CVD methods, and laser CVD methods. An example of the liquid-phase film formation methods is wet plating. Examples of the wet plating include electroplating, immersion plating, and electroless plating. Examples of the printing techniques include ink-jet printing methods and screen printing.

A method for producing the secondary battery 10 is not particularly limited. For example, the secondary battery 10 may be produced, for example, by sequentially pressing the material of the positive electrode 12, the material of the solid electrolyte layer 13, and the material of the negative electrode 14.

3. Experimental Result 3-1. Production of Sample

Various samples were produced by procedures described below.

Anhydrous magnesium chloride ($MgCl_2$), anhydrous calcium chloride ($CaCl_2$)), and anhydrous gallium chloride ($GaCl_3$) were provided as raw materials. These raw materials were weighed in such a manner that the molar ratio of Mg to Ca to Ga was 0.98:0.02:2. The weighed raw materials were mixed in a mortar. The mixture was sealed in a glass ampoule. All the steps described above were performed in a glove box under a nitrogen atmosphere. The ampoule was placed in a furnace. The mixture was heated at 500° C. for 24 hours to provide a sample of Example 1.

Samples of Examples 2 to 4 and Comparative example 1 were produced in the same way as in Example 1, except that different molar ratios of Mg and Ca were used. The compositions of the samples of Examples 2 to 4 and Comparative example 1 are presented in Table.

Samples of Example 5 and Comparative example 2 were produced in the same way as in Example 1, except that anhydrous strontium chloride ($SrCl_2$) was used in place of $CaCl_2$) and different molar ratios of Mg and Sr were used. The compositions of the samples of Example 5 and Comparative example 2 are presented in Table.

Samples of Examples 6 and 7 and Comparative example 3 were produced in the same way as in Example 1, except that anhydrous barium chloride ($BaCl_2$) was used in place of $CaCl_2$) and different molar ratios of Mg and Ba were used. The compositions of the samples of Examples 6 and 7 and Comparative example 3 are presented in Table.

A sample of Comparative example 4 was produced in the same way as in Example 1, except that Ca was not mixed and the molar ratio of Mg to Ga was different.

TABLE

| | Composition | Ionic conductivity (S/cm) |
|---|---|---|
| Example 1 | $Mg_{0.98}Ca_{0.02}Ga_2Cl_8$ | $2.8 \times 10^{-6}$ |
| Example 2 | $Mg_{0.95}Ca_{0.05}Ga_2Cl_8$ | $3.0 \times 10^{-6}$ |
| Example 3 | $Mg_{0.9}Ca_{0.1}Ga_2Cl_8$ | $3.4 \times 10^{-6}$ |
| Example 4 | $Mg_{0.85}Ca_{0.15}Ga_2Cl_8$ | $1.5 \times 10^{-6}$ |
| Comparative example 1 | $Mg_{0.8}Ca_{0.2}Ga_2Cl_8$ | $2.9 \times 10^{-7}$ |
| Example 5 | $Mg_{0.95}Sr_{0.05}Ga_2Cl_8$ | $2.1 \times 10^{-6}$ |
| Comparative example 2 | $Mg_{0.8}Sr_{0.2}Ga_2Cl_8$ | $3.6 \times 10^{-8}$ |
| Example 6 | $Mg_{0.98}Ba_{0.02}Ga_2Cl_8$ | $1.0 \times 10^{-6}$ |
| Example 7 | $Mg_{0.95}Ba_{0.05}Ga_2Cl_8$ | $6.8 \times 10^{-6}$ |
| Comparative example 3 | $Mg_{0.8}Ba_{0.2}Ga_2Cl_8$ | $7.6 \times 10^{-8}$ |
| Comparative example 4 | $MgGa_2Cl_8$ | $4.6 \times 10^{-7}$ |

3-2. Ionic Conductivity

The ionic conductivities of the samples of Examples 1 to 7 and Comparative examples 1 to 4 were measured by alternating current impedance measurement and evaluated.

Pellets for evaluation were produced from the samples by a procedure described below. An appropriate amount of each sample was weighed in a glove box filled with a nitrogen atmosphere. The weighed sample was placed in a poly (ethylene carbonate) tube having an inside diameter of 10 mm, an outside diameter of 30 mm, and a height of 20 mm. The sample was held with a jig composed of stainless steel (SUS 304, specified by Japanese Industrial Standards). The sample was pressed at a pressure of 5 N/cm² with a uniaxial pressing machine (P-16B, available from RIKEN SEIKI) via the jig to form a pellet having a diameter of 10 mm and a freely-selected thickness. The jig was set to another jig for fixation with the pellet held. Thus, the pellet was fixed in a state being pressed at a pressure of 5 N/cm². The pellet was introduced together with the jig into a gastight container while the state is maintained. The gastight container was filled with a nitrogen atmosphere, and the nitrogen atmosphere was maintained. Electrode terminals disposed outside the gastight container were electrically connected to the jig in the gastight container through lead lines.

The pellet of each sample was subjected to alternating current impedance measurement. An electrochemical measurement system (Modulab, available from Solartron Analytical) was used as a measurement device. An environmental tester (PR-2KP, available from Espec Corp.) was used as a constant-temperature unit. The alternating current impedance of the sample was measured at an alternating voltage of 50 to 100 mV in a frequency range of 0.01 Hz to 1 MHz at 25° C. This measurement revealed the resistance of the pellet of the sample in the direction normal to a main surface of the pellet. The resistance was converted into ionic conductivity. In this way, the ionic conductivity of the samples of Examples 1 to 7 and Comparative examples 1 to 4 were obtained. Table presents these results.

As presented in Table, each of the samples of Examples 1 to 7 had an ionic conductivity of $1.0 \times 10^{-6}$ S/cm or more. The ionic conductivity was higher than that of the sample of Comparative example 4, in which Mg was not substituted with Ca, Sr, or Ba. This result indicates that the substitution of Mg with Ca, Sr, or Ba improves the ionic conductivity. Each of the samples of Comparative examples 1 to 3, in which 20% of Mg was substituted with Ca, Sr, or Ba, had a lower ionic conductivity than the sample of Comparative example 4. The reason for this is presumably that an excessively high degree of substitution results in an unstable structure and/or a decrease in magnesium content.

As described in Section "1-2. Improvement in Magnesium-Ion Conduction", the partial substitution of Mg increases the size of the lattice of the coordination polyhedron and/or the distance between coordination polyhedra to improve the magnesium-ion conductivity. Thus, even in the case where Mg is substituted with two or more substituents or where the halogen is other than chlorine, the same effects are presumably provided.

What is claimed is:

1. A solid electrolyte, comprising:
   a composite metal halide containing:
      magnesium;
      an alkaline-earth metal having a larger ionic radius than magnesium;
      gallium; and
      a halogen,
   wherein in the composite metal halide, a molar ratio of the alkaline-earth metal to a total of magnesium and the alkaline-earth metal is more than zero and less than 0.2.

2. The solid electrolyte according to claim 1, wherein the composite metal halide is represented by a formula $Mg_{1-a}M_aGa_2X_8$, where M is at least one selected from the group consisting of Ca, Sr, and Ba; X is at least one selected from the group consisting of Cl, Br, and I; and $0<a<0.2$.

3. The solid electrolyte according to claim 2, wherein $0.02 \leq a \leq 0.15$.

4. The solid electrolyte according to claim 2, wherein X is Cl.

5. The solid electrolyte according to claim 2, wherein M is Ca.

6. A magnesium secondary battery, comprising:
   a positive electrode;
   a negative electrode; and
   the solid electrolyte according to claim 1.

7. The magnesium secondary battery according to claim 6,
   wherein at least one of the positive electrode and the negative electrode includes a mixture layer that includes:
      active material particles; and
      particles of the solid electrolyte.

8. The magnesium secondary battery according to claim 6,
   wherein at least one of the positive electrode and the negative electrode includes a mixture layer that includes:
      active material particles;
      coats of the solid electrolyte that cover the respective active material particles; and
      solid electrolyte particles.

9. The magnesium secondary battery according to claim 7, further comprising:
   a solid electrolyte layer that includes particles of a same material as the solid electrolyte contained in the mixture layer, but includes no particles of a same material as the active material particles included in the positive electrode or the negative electrode.

10. The magnesium secondary battery according to claim 9,
    wherein the positive electrode, the solid electrolyte layer, and the negative electrode are stacked in this order.

11. The solid electrolyte according to claim 2, wherein M is Sr.

12. The solid electrolyte according to claim 2, wherein M is Ba.

* * * * *